US012739796B2

(12) United States Patent
Ren et al.

(10) Patent No.: US 12,739,796 B2
(45) Date of Patent: Sep. 15, 2026

(54) COMBINATORIAL NUMBER PROCESSING METHOD, SEQUENCE DETERMINATION METHOD AND APPARATUS, AND DEVICE AND STORAGE MEDIUM

(71) Applicant: VIVO MOBILE COMMUNICATION CO., LTD., Guangdong (CN)

(72) Inventors: Qianyao Ren, Guangdong (CN); Yang Song, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 339 days.

(21) Appl. No.: 18/617,735

(22) Filed: Mar. 27, 2024

(65) Prior Publication Data

US 2024/0236952 A1 Jul. 11, 2024

Related U.S. Application Data

(63) Continuation of application No. PCT/CN2022/121261, filed on Sep. 26, 2022.

(30) Foreign Application Priority Data

Sep. 28, 2021 (CN) .......................... 202111143952.5

(51) Int. Cl.
*H04W 72/04* (2023.01)

(52) U.S. Cl.
CPC .................................. *H04W 72/04* (2013.01)

(58) Field of Classification Search
CPC .................................................... H04W 72/04
See application file for complete search history.

(56) References Cited

U.S. PATENT DOCUMENTS

2007/0277036 A1* 11/2007 Chamberlain ........ G06F 9/4881 713/171
2014/0370930 A1* 12/2014 Kurokochi ............ H04W 16/18 455/522
2019/0230545 A1* 7/2019 Liou ..................... H04W 24/10
2019/0357204 A1* 11/2019 Matsumura ......... H04L 27/2613
2020/0127795 A1* 4/2020 Matsumura ........... H04L 1/1861
2020/0163081 A1* 5/2020 Kim ...................... H04L 5/0053
2020/0266947 A1* 8/2020 Noh ...................... H04L 27/186

(Continued)

OTHER PUBLICATIONS

"NR; Physical layer procedures for data (3GPP TS 38.214 version 16.6.0 Release 16)", ETSI Technical Specification, European Telecommunications Standards Institute (ETSI), 650, Route Des Lucioles; F-06921 Sophia-Antipolis; France, vol. 3GPP RAN, No. V16.6.0, Aug. 19, 2021 (Aug. 19, 2021), pp. 1-176, XP014400023.

(Continued)

*Primary Examiner* — Ajay Cattungal

(57) ABSTRACT

This application provides a combinatorial number processing method, a sequence determination method and apparatus, and a device and a storage medium. The combinatorial number processing method in the embodiments of this application includes: selecting, by a terminal, a sequence; and executing, by the terminal, a target operation based on the sequence selected by the terminal, where the target operation includes the following: determining a target combinatorial number, and reporting the target combinatorial number; and in a case that the sequence selected by the terminal is all of a total sequence, not reporting the combinatorial number.

20 Claims, 6 Drawing Sheets

(56) References Cited

U.S. PATENT DOCUMENTS

| | | | | |
|---|---|---|---|---|
| 2020/0285816 | A1* | 9/2020 | Xie | G06F 40/12 |
| 2021/0242914 | A1 | 8/2021 | Park et al. | |
| 2021/0336669 | A1* | 10/2021 | Huang | H04L 27/2634 |
| 2022/0052895 | A1* | 2/2022 | Ly | H04L 5/0042 |
| 2022/0165167 | A1* | 5/2022 | Cao | G08G 5/55 |
| 2022/0174509 | A1* | 6/2022 | Noh | H04W 56/001 |
| 2022/0210844 | A1* | 6/2022 | MolavianJazi | H04L 5/0053 |
| 2022/0232655 | A1* | 7/2022 | Noh | H04W 76/16 |
| 2022/0272547 | A1* | 8/2022 | Noh | H04B 7/15528 |
| 2022/0352947 | A1* | 11/2022 | Rahman | H04B 7/0634 |
| 2022/0361052 | A1* | 11/2022 | Pantelidou | H04W 36/362 |
| 2023/0289444 | A1* | 9/2023 | Ermey | G06F 21/552 |

OTHER PUBLICATIONS

Grant Notice dated Jul. 1, 2025 received in corresponding patent family application No. CN202111143952.5. English translation attached.

Extended European Search Report dated Jan. 2, 2025 received in corresponding European Application No. EP22874829.9.

Notice of Reasons for Refusal dated Mar. 4, 2025 received in corresponding patent family application No. JP2024518759. English translation attached.

International Search Report dated Dec. 21, 2022 in International Application No. PCT/CN2022/121261. English translation attached.

Written Opinion dated Dec. 21, 2022 in International Application No. PCT/CN2022/121261. English translation attached.

* cited by examiner

Start
Determines, by the network side device, the sequence selected by the terminal
301
End 400
Selection module
401
Execution module
402
Combinatorial number processing apparatus

COMBINATORIAL NUMBER PROCESSING METHOD, SEQUENCE DETERMINATION METHOD AND APPARATUS, AND DEVICE AND STORAGE MEDIUM

CROSS-REFERENCE TO RELATED APPLICATIONS

This application is a Bypass continuation application of PCT International Application No. PCT/CN2022/121261 filed on Sep. 26, 2022, which claims the priority of Chinese Patent Application No. 202111143952.5 filed in China on Sep. 28, 2021, the entire contents of which are hereby incorporated by reference in their entireties.

TECHNICAL FIELD

This application belongs to the technical field of communications, and provides a combinatorial number processing method, a sequence determination method and apparatus, and a device and a storage medium.

BACKGROUND

In some communication systems (for example, a 5th-Generation (5G) system or a 6th-Generation (6G) system), a terminal is supported by a terminal to reduce signaling overheads by reporting a combinatorial number. However, in the existing technology to report the combinatorial number by the terminal, the terminal reports the combinatorial number corresponding to a sequence selected by the terminal all the time, resulting in great overheads of reporting the combinatorial number. Moreover, the complexity of an existing combinatorial number calculation method increases with increase of the length of the selected sequence. In addition, at present, the maximum value represented by columns in a table used by the terminal to calculate the combinatorial number is too small, resulting in a too short sequence corresponding to the reported combinatorial number. As it can be seen that the performance of the terminal reporting the combinatorial number is poor.

SUMMARY

Embodiments of this application provide a combinatorial number processing method, a sequence determination device and apparatus, a device and a storage medium.

According to a first aspect, an embodiment of this application provides a combinatorial number processing method, including:

selecting, by a terminal, a sequence; and executing, by the terminal, a target operation based on the sequence selected by the terminal, where the target operation includes the following:

determining a target combinatorial number, and reporting the target combinatorial number; and in a case that the sequence selected by the terminal is all of a total sequence, not reporting the combinatorial number;

where the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that a length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, L is the length of the sequence selected by the terminal, and C(N,L) represents a combinatorial number formed by combining N and L; and in a case that the length of the sequence selected by the terminal is smaller than or equal to the half of the sequence length of the total sequence, the target combinatorial number is a combinatorial number corresponding to the sequence selected by the terminal.

According to a second aspect, an embodiment of this application provides a sequence determination method, including:

determining, by a network side device, a sequence selected by a terminal, where the step of determining the sequence selected by the terminal comprises the following:

receiving a target combinatorial number reported by the terminal, and determining the sequence selected by the terminal based on the target combinatorial number; and in a case that the terminal does not report the combinatorial number, determining that the sequence selected by the terminal is all of a total sequence;

where the target combinatorial number has at least one of the following characteristics:

the maximum value represented by columns in a first table corresponding to the target combinatorial number is greater than ½ of the maximum value represented by rows;

in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, L is the length of the sequence selected by the terminal, and C(N,L) represents a combinatorial number formed by combining N and L; and in a case that the length of the sequence selected by the terminal is smaller than or equal to the half of the sequence length of the total sequence, the target combinatorial number is a combinatorial number corresponding to the sequence selected by the terminal.

According to a third aspect, an embodiment of this application provides a combinatorial number processing apparatus, including:

a selection module, configured to select a sequence;

an execution module, configured to execute, by the terminal, a target operation based on the sequence selected by the terminal, where the target operation comprises the following:

determining a target combinatorial number, and reporting the target combinatorial number; and in a case that the sequence selected by the terminal is all of a total sequence, not reporting the combinatorial number;

where the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

According to a fourth aspect, an embodiment of this application provides a sequence determination apparatus, including:

a determination module, configured to determine, by a network side device, a sequence selected by a terminal, where the step of determining the sequence selected by the terminal comprises the following:

receiving a target combinatorial number reported by the terminal, and determining the sequence selected by the terminal based on the target combinatorial number; and in a case that the terminal does not report the combinatorial number, determining that the sequence selected by the terminal is all of a total sequence;

where the target combinatorial number has at least one of the following characteristics:

the maximum value represented by columns in a first table corresponding to the target combinatorial number is greater than ½ of the maximum value represented by rows;

in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

According to a fifth aspect, an embodiment of this application provides a terminal, including: a memory, a processor, and a program or instruction stored on the memory and executable on the processor, where the program or instruction, when executed by the processor, implements the steps of the combinatorial number processing method provided by the embodiment of this application.

According to a sixth aspect, an embodiment of this application provides a terminal, including: a processor and a communication interface, where the processor or the communication interface is configured to: select a sequence; and execute a target operation based on the sequence selected by the terminal, where the target operation includes the following: determine a target combinatorial number, and report the target combinatorial number; and in a case that the sequence selected by the terminal is all of a total sequence, not report the combinatorial number; where the target combinatorial number has at least one of the following characteristics: the maximum value represented by columns in a first table for calculating the target combinatorial number is greater than ½ of the maximum value represented by rows; in a case that a first condition is satisfied, the target combinatorial number is calculated in a target calculation mode, a first value and a second value in the target calculation mode are same relative to a combinatorial number of a third value, and a sum of the first value and the second value is the third value; in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

According to a seventh aspect, an embodiment of this application provides a network side device, including: a memory, a processor, and a program or instruction stored on the memory and executable on the processor, where the program or instruction, when executed by the processor, implements the steps of the sequence determination method provided by the embodiment of this application.

According to an eighth aspect, an embodiment of this application provides a network side device, including: a processor and a communication interface, where the processor or the communication interface is configured to: determine a sequence selected by a terminal, where the step of determining the sequence selected by the terminal includes the following: receiving a target combinatorial number reported by the terminal, and determining the sequence selected by the terminal based on the target combinatorial number; and in a case that the terminal does not report the combinatorial number, determining that the sequence selected by the terminal is all of a total sequence; where the target combinatorial number has at least one of the following characteristics: the maximum value represented by columns in a first table corresponding to the target combinatorial number is greater than ½ of the maximum value represented by rows; in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value; in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

According to a ninth aspect, an embodiment of this application provides a readable storage medium, having a program or instruction stored in the readable storage medium, where the program or instruction, when executed by the processor, implements the steps of the combinatorial number processing method provided by the embodiment of this application or the program or instruction, when executed by the processor, implements the steps of the sequence determination method provided by the embodiment of this application.

According to a tenth aspect, an embodiment of this application provides a chip. The chip includes a processor and a communication interface, where the communication interface is coupled to the processor, and the processor is configured to run a program or an instruction to implement the method in the first aspect or the second aspect.

According to an eleventh aspect, a computer program product is provided, where the computer program product is stored in a non-transient storage medium, the computer program product being executed by at least one processor to implement the steps of the combinatorial number processing method provided by the embodiment of this application, or the computer program product being executed by at least one processor to implement the steps of the sequence determination method provided by the embodiment of this application.

According to a twelfth aspect, an embodiment of this application provides a communication device. The communication device is configured to execute the method in the first aspect or the second aspect.

DETAILED DESCRIPTION

The technical solutions in embodiments of this application are clearly described in the following with reference to the drawings in the embodiments of this application. Apparently, the described embodiments are merely some rather than all of the embodiments of this application. All other embodiments obtained by those of ordinary skill in the art based on the embodiments of this application fall within the protection scope of this application.

The specification and claims of this application, and terms "first" and "second" are used to distinguish similar objects, but are unnecessarily used to describe a specific sequence or order. It is to be understood that the terms used in this way are exchangeable in a proper case, so that the embodiments of this application can be implemented in an order different from the order shown or described herein, and objects distinguished by "first" and "second" are usually of the same category and the number of the objects is not defined. For example, there may be one or more first objects. In addition, "and/or" in the description and claims represents at least one of connected objects, and the character "/" usually represents that previous and next associated objects form an "or" relationship.

It is worth noting that the technologies described in this embodiment of this application are not limited to the LTE/LTE-advanced (LTE-A) system, and may further be applied to various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" in this embodiment of this application are usually interchangeably used, and the technologies described can be applied to the systems and radio technologies mentioned above, and can also be applied to other systems and radio technologies. For an exemplary purpose, a new radio (NR) system is described in the following description, and the term NR is used in most description below. However, these technologies can also be applied to other applications besides the NR system, for example, a 6th generation (6G) communication system.

Figure 1:
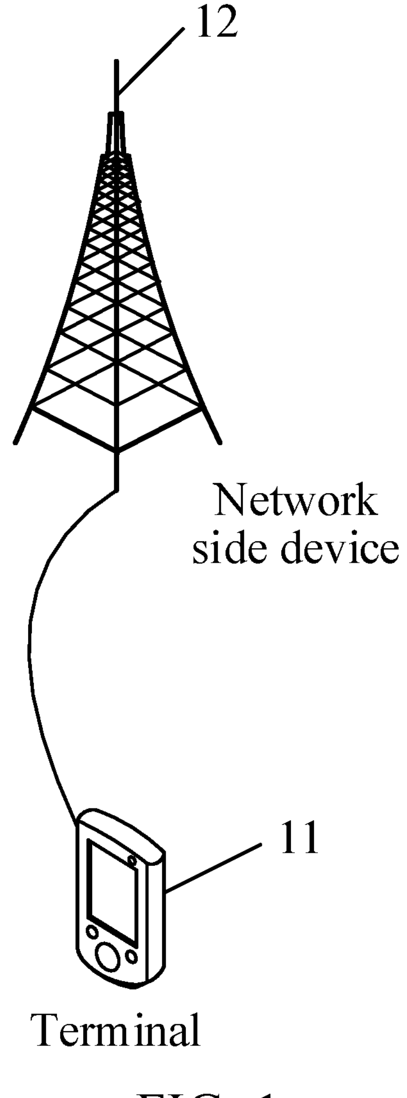
FIG. 1 is a block diagram of a wireless communication system to which an embodiment of this application can be applied.

FIG. 1 is a block diagram of a wireless communication system to which an embodiment of this application can be applied. The wireless communication system includes a terminal 11 and a network side device 12.

The terminal 11 may also be known as a terminal device or user equipment (UE). The terminal 11 may be terminal side devices such as a mobile phone, a tablet personal computer, a laptop computer or a notebook computer, a personal digital assistant (PDA), a palmtop computer, a notebook, an ultra-mobile person computer (UMPC), a mobile Internet device (MID), an augmented reality (AR)/virtual reality (VR) device, a robot, a wearable device or vehicle user equipment (VUE), and pedestrian user equipment (PUE), a smart home (smart home with a wireless communication function, for example, a refrigerator, a television, a washer or furniture), the wearable device including: a smart watch, a smart bracelet, a smart earphone, smart eyeglasses, smart jewelry (a smart bangle, a smart chain bracelet, a smart ring, a smart necklace, a smart anklet, a smart anklet chain and the like), a smart wristband, smart clothing, a game machine and the like. It is to be noted that in the embodiments of this application, a specific type of the terminal 11 is not limited.

The network side device 12 may be a network element of a core network or a base station, where the network element of the core network may be an access and mobility management function (AMF) or a mobility management entity (MME). The base stations may also be known as NodesB, evolution NodesB, access points, base transceiver stations (BTS), radio base stations, radio transceivers, basic service sets (BSS), extended service sets (ESS), NodesB, evolution NodesB (CNB), household NodesB, household evolution NodesB, WLAN access points, WiFi nodes, transmitting receiving points (TRP), wireless access network nodes or some other appropriate terms in the field as long as the same technical effect is achieved. The base stations are not limited to the appointed technical vocabularies. It is to be noted that the base stations in the NR system are taken as an example only in this embodiment of this application, but the specific type of the base stations is not limited.

A combinatorial number processing method, a sequence determination method and apparatus, a device, and a storage medium provided in the embodiments of this application are described in detail below in conjunction with drawings through some embodiments and application scenarios thereof.

Figure 2:
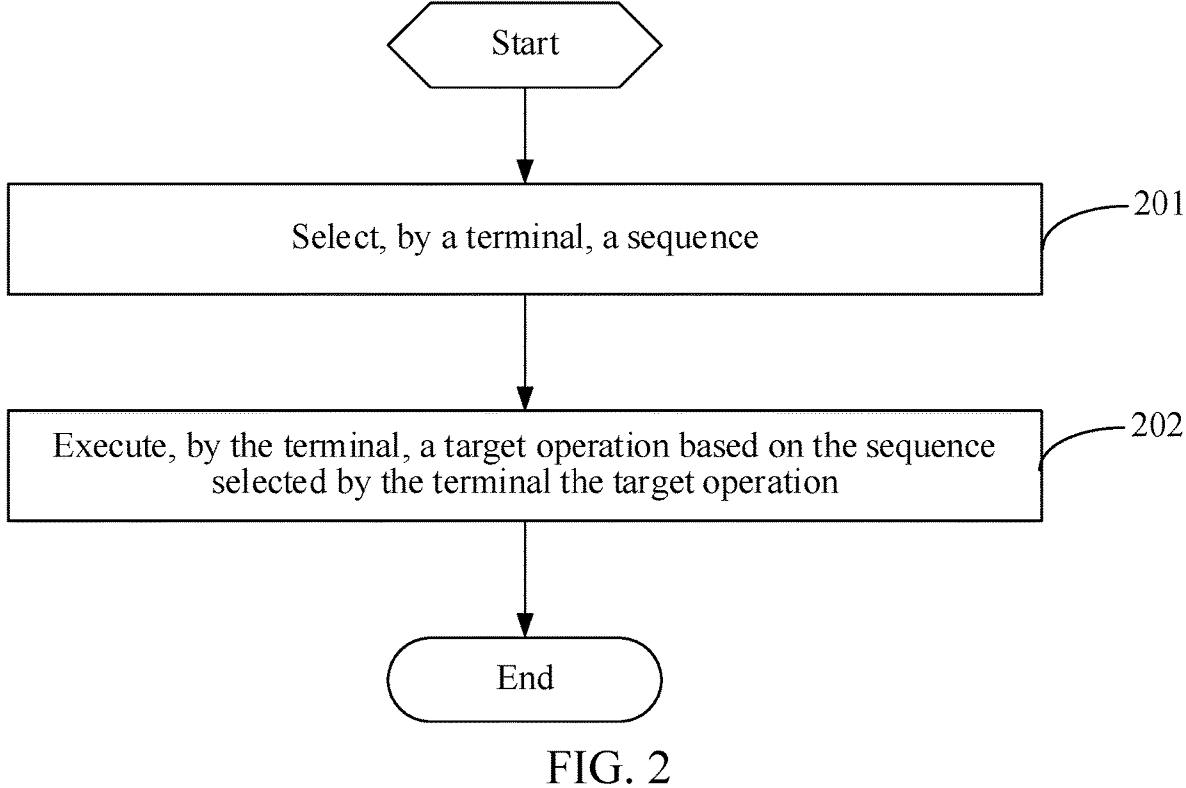
FIG. 2 is a flowchart of a combinatorial number processing method provided by an embodiment of this application.

Referring to FIG. 2, FIG. 2 is a flowchart of a combinatorial number processing method provided by an embodiment of this application. As shown in FIG. 2, the method includes the following steps:

S201: a terminal selects a sequence.

The step that the terminal selects the sequence may include that the terminal selects one or more elements in a total sequence, for example, all or a part of elements are selected in the total sequence.

The total sequence is pre-configured, for example, a sequence defined by a protocol or a sequence configured at a network side or an arithmetic progression from 0 to a certain length with the step size of 1.

S202: the terminal executes a target operation based on the sequence selected by the terminal, where the target operation includes the following:

a target combinatorial number is determined, and the target combinatorial number is reported;

in a case that the sequence selected by the terminal is all of a total sequence, the combinatorial number is not reported;

where the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is $C(N,L)-1$, where N is the sequence length of the total sequence, L is the length of the sequence selected by the terminal, and C(N,L) represents a combinatorial number formed by combining N and L; and in a case that the length of the sequence selected by the terminal is smaller than or equal to the half of the sequence length of the total sequence, the target combinatorial number is a combinatorial number corresponding to the sequence selected by the terminal.

The sequence selected by the terminal is all of the total sequence, which means that the terminal selects all elements in the total sequence. Therefore, in this case, the combinatorial number is not reported. The network side device may also know that the terminal selects all the elements of the total sequence, and as a result, a reporting resource of the terminal may be saved, so that the performance of the terminal reporting the combinatorial number is improved.

In addition, in the embodiment of this application, in a case that the sequence selected by the terminal is all of the total sequence, the target combinatorial number may also be determined, and the target combinatorial number is reported. Specifically, the antitone sequence may be determined as null, so that the combinatorial number corresponding to the target combined sequence which is null is determined, i.e., 0. The combinatorial number 0 is reported to indicate that the sequence selected by the terminal is all of the total sequence; or, a combinatorial number calculation formula is directly used to calculate the combinatorial number 0 of the sequence selected by the terminal, and the combinatorial number 0 is reported to indicate that the sequence selected by the terminal is all of the total sequence.

In the embodiment of this application, the sequence selected by the terminal may include one or more elements, that is to say, the length of the sequence selected by the terminal is 1 or an integer greater than 1. Each element corresponds to one C(x, y). The combinatorial number corresponding to the sequence selected by the terminal is a combinatorial number calculated by C(x, y) corresponding to all elements in the sequence. For example, in a case that the target combinatorial number is the combinatorial number corresponding to the sequence selected by the terminal, the target combinatorial number may be calculated by the following equation:

$$i_{com} = \sum_{i=0}^{L-1} C\left(N - 1 - n^{(i)},\ L - i\right)$$

where $i_{com}$ represents the target combinatorial number; the $C(N-1-n^{(i)}, L-i)$ is obtained by table look-up, specifically with reference to the first table and the second table provided in the embodiment of this application, or other tables defined by the protocol; and $n^{(i)}$ is an index corresponding to the $i^{th}$ element in the sequence selected by the terminal, i representing i elements in the sequence selected by the terminal, $i=0, \ldots, L-1$.

It is to be noted that C(,) in the present disclosure is the combinatorial number, specifically represented by C(x, y), i.e., in the above equation, x is $N-1-n^{(i)}$, and y is $L-i$.

For example, in a case that the target combinatorial number is the combinatorial number corresponding to the antitone sequence, the target combinatorial number may be calculated by the following equation:

$$i_{com} = \begin{cases} \sum_{i=0}^{N-L-1} C\left(N - 1 - m^{(i)},\ N - L - i\right), & N > L \\ 0, & N = L \end{cases}$$

where $i_{com}$ represents the target combinatorial number; the $C(N-1-n^{(i)}, N-L-i)$ is obtained by table look-up, specifically with reference to the first table and the second table provided in the embodiment of this application, or other tables defined by the protocol; and $m^{(i)}$ is an index corresponding to the $i^{th}$ element in the antitone sequence, i representing i elements in the antitone sequence, $i=0, \ldots, N-L-1$. When N=L represents that the sequence selected by the terminal is all of the total sequence, in a case that the sequence selected by the terminal is all of the total sequence, table look-up is not needed, and $i_{com}=0$ is directly calculated.

It is to be noted that in the embodiment of this application, an implementation of calculating the target combinatorial number is not limited, and besides the above two calculation modes, a calculation mode of reporting the combinatorial number by the terminal newly defined in a subsequent protocol version.

In the embodiment of this application, the first table is a table acquired by the terminal in advance for determining the combinatorial number, and the table may be defined by the protocol or configured at the network side. The columns in the table represent the candidate values of y in the combinatorial number C(x,y). The rows in the table represent the candidate values of x in the combinatorial number C(x,y). The value of the combinatorial number C(x,y) may be inquired in the representation through the values of x and y. For example, the first table may be shown in a table 1:

TABLE 1

| | y | | | | | | | | | | | | | | |
|---|---|---|---|---|---|---|---|---|---|---|---|---|---|---|---|
| x | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 |
| 2 | 2 | 1 | 0 | 0 | 0 | 0 | 0 | 0 | 0 | 0 | 0 | 0 | 0 | 0 | 0 |
| 3 | 3 | 3 | 1 | 0 | 0 | 0 | 0 | 0 | 0 | 0 | 0 | 0 | 0 | 0 | 0 |
| 4 | 4 | 6 | 4 | 1 | 0 | 0 | 0 | 0 | 0 | 0 | 0 | 0 | 0 | 0 | 0 |
| 5 | 5 | 10 | 10 | 5 | 1 | 0 | 0 | 0 | 0 | 0 | 0 | 0 | 0 | 0 | 0 |
| 6 | 6 | 15 | 20 | 15 | 6 | 1 | 0 | 0 | 0 | 0 | 0 | 0 | 0 | 0 | 0 |
| 7 | 7 | 21 | 35 | 35 | 21 | 7 | 1 | 0 | 0 | 0 | 0 | 0 | 0 | 0 | 0 |
| 8 | 8 | 28 | 56 | 70 | 56 | 28 | 8 | 1 | 0 | 0 | 0 | 0 | 0 | 0 | 0 |
| 9 | 9 | 36 | 84 | 126 | 126 | 84 | 36 | 9 | 1 | 0 | 0 | 0 | 0 | 0 | 0 |
| 10 | 10 | 45 | 120 | 210 | 252 | 210 | 120 | 45 | 10 | 1 | 0 | 0 | 0 | 0 | 0 |

TABLE 1-continued

| | y | | | | | | | | | | | | | | |
|---|---|---|---|---|---|---|---|---|---|---|---|---|---|---|---|
| x | 1 | 2 | 3 | 4 | 5 | 6 | 7 | 8 | 9 | 10 | 11 | 12 | 13 | 14 | 15 |
| 11 | 11 | 55 | 165 | 330 | 462 | 462 | 330 | 165 | 55 | 11 | 1 | 0 | 0 | 0 | 0 |
| 12 | 12 | 66 | 220 | 495 | 792 | 924 | 792 | 495 | 220 | 66 | 12 | 1 | 0 | 0 | 0 |
| 13 | 13 | 78 | 286 | 715 | 1287 | 1716 | 1716 | 1287 | 715 | 286 | 78 | 13 | 1 | 0 | 0 |
| 14 | 14 | 91 | 364 | 1001 | 2002 | 3003 | 3432 | 3003 | 2002 | 1001 | 364 | 91 | 14 | 1 | 0 |
| 15 | 15 | 105 | 455 | 1365 | 3003 | 5005 | 6435 | 6435 | 5005 | 3004 | 1365 | 455 | 105 | 15 | 1 |

In the table 1, the candidate values of y are 1-15, and the candidate values of x are 0-15. Thus, in the process of determining the target combinatorial number, by means of the table, the combinatorial number of any combination of the values of y being 1-15 and the values of x being 0-15 may be determined.

In the embodiment of this application, because the maximum value represented by the columns in the first table is greater than ½ of the maximum value represented by the rows, more elements can be selected from the total sequence for reporting, i.e., the combinatorial number of a long sequence is reported. For example, by taking the above table as an example, the combinatorial number with the length of the sequence at most 16 may be reported, i.e., the terminal may select 16 elements from the total sequence at most, and report the corresponding combinatorial number.

In the embodiment of this application, the sequence includes one or more elements, and the length of the sequence may be construed as the number of elements.

In the embodiment of this application, the first condition is a condition which is satisfied by actual values of x and y in calculating C(x,y) in the combinatorial number calculation process, for example, x/2>=y. Thus, because the first value and the second value are same relative to the combinatorial number of the third value, a table look-up result of one of the values may determine the combinatorial number of the two values, for example, for c(8,6) and c(8,2), the combinatorial number corresponding to c(8,6) and c(8,2) can be acquired by looking up a table c(8,2), so that the size of the table is reduced, and the storage space is saved. The terminal may also be supported to report the combinatorial number of the longer sequence, so that the performance of the terminal reporting the combinatorial number is improved.

In the embodiment of this application, the total sequence is a sequence combined by all candidate elements, for example, The sequence length of the total sequence is 8, i.e., the N is equal to 8, and the 8 element indexes are respectively 0,1,2,3,4,5,6,7. When the terminal selects the elements with the indexes of 0, 1, 3, 4, 5, 6, i.e., the L is equal to 6, the antitone sequence is a sequence formed by elements 2, 7.

In the embodiment of this application, in a case that the length of the sequence selected by the terminal is greater than the half of the sequence length of the total sequence, the target combinatorial number is the target combinatorial number corresponding to the antitone sequence. Thus, the network side device may analyze the antitone sequence through the target combinatorial number, so as to deduce the sequence selected by the terminal through the antitone sequence. Therefore, the sequence length of the combinatorial number may be reduced, so that the calculating overheads of the terminal are further saved. Because the elements for calculating the combinatorial number is decreased, so that the table look-up number of times for calculating the combinatorial number is also decreased.

In the embodiment of this application, the target combinatorial number is the combinatorial number obtained from the reference combinatorial number minus the combinatorial number corresponding to the antitone sequence, which may be represented as $C(N,L)-1-i_{com}$, where C(N,L) represents the combinatorial number formed by combining N and L, and $i_{com}$ represents the combinatorial number corresponding to the antitone sequence. Therefore, because $C(N,L)-1-i_{com}$ is reported, the calculating overheads of the terminal may be reduced. Moreover, the network side device may determine the sequence selected by the terminal based on $C(N,L)-1-i_{com}$ according to the method defined by the protocol.

In addition, in the embodiment of this application, in a case that the length of the sequence selected by the terminal is smaller than or equal to the half of the sequence length of the total sequence, the target combinatorial number is the combinatorial number corresponding to the sequence selected by the terminal. Therefore, because the length of the sequence selected by the terminal is smaller than or equal to the half of the sequence length of the total sequence, the calculating overheads may also be reduced for the combinatorial number corresponding to the sequence selected by the terminal.

It is to be noted that in the embodiment of this application, in the corresponding implementation where the first table or the first condition is used, the target combinatorial number reported by the terminal may be the combinatorial number corresponding to the antitone sequence, or the combinatorial number obtained from the reference combinatorial number minus the combinatorial number corresponding to the antitone sequence, or the combinatorial number corresponding to the sequence selected by the terminal, which is not limited.

In the embodiment of this application, the terminal may be supported to report the combinatorial number corresponding to a longer sequence by means of the first table and the operations corresponding to the first condition. The complexity of the terminal calculating the combinatorial number and the complexity of the network side device restoring the sequence may be reduced by means of the operations corresponding to the antitone sequence. As it can be seen that the combinatorial number reporting performance of the terminal may be improved by the embodiment of this application.

In the embodiment of this application, the scenarios suitable for reporting the combinatorial number are not limited, for example, it may be applied to a Channel State Information (CSI) reporting scenario, i.e., the target combinatorial number is put on the CSI for reporting. In the scenario, the elements in the sequence may be orthogonal bases, and the orthogonal bases with multiple dimensionalities may be reported. For example, there are N1 candidate elements in the first dimensionality, which belong to a set {0, . . . , N1−1}; there are N2 candidate elements in the second dimensionality, which belong to a set {0, . . . , N2−1}; and global elements synthesized by the dimensionalities belong to a set {0, . . . , N1N2−1}. The terminal needs to select L orthogonal bases from the N1N2 (the N is equal to N1N2) orthogonal bases and report them to the network side device. For example, it may also be applied to a scenario where the reporting overheads are reduced by reporting the combinatorial number, which is not limited.

As an optional implementation, a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and where in a process of determining the target combinatorial number, a value of x is relevant to the sequence length of the total sequence, and a value of y is relevant to the sequence selected by the terminal.

The first table may be a table shown in table 1, and the maximum candidate value of y in the first table is equal to the maximum candidate value of x, being 15, for example, in the first table, the maximum candidate value of y is 15, and the maximum candidate value of x is 15. Of course, the maximum candidate value which is 15 is an optional implementation, and the first table may be specifically configured according to an actual reporting demand, for example, the maximum candidate value of y may be configured as an integer greater than 15 such as 16, 18 and 32, and the maximum candidate value of x may be configured as an integer greater than 15 such as 16, 18 and 32.

The value of x is related to the sequence length of the total sequence. The value of x is determined through the sequence length of the total sequence and the indexes of elements in the sequence selected by the terminal. The value of y is related to the sequence length of the total sequence, which means that the value of y is determined through the sequence length of the total sequence and the elements in the sequence selected by the terminal. For example, the combinatorial number corresponding to the $i^{th}$ element in the sequence selected by the terminal may be represented as $C(N-1-n^{(i)}, L-i)$, i.e., for the elements, x is $N-1-n^{(1)}$, y is L−i. Thus, the value of the combinatorial number may be looked up in the first table through the values of x and y.

In the implementation, because the maximum candidate value of y in the first table is equal to the maximum candidate value of x, the length of the sequence selected by the terminal may be equal to the length of the total sequence, so that the terminal reports the combinatorial number corresponding to more elements to improve the combinatorial number reporting performance of the terminal. A situation that at most 16 elements are selected from 16 elements may be supported in the table 1.

It is to be noted that in the embodiment of this application, the maximum candidate value of y is not defined to be equal to the maximum candidate value of x in the first table, for example, in some implementations, the maximum candidate value of y is 1 or 2 smaller than the maximum candidate value of x in the first table; for example, the maximum candidate value of x is 15, and the maximum candidate value of y may be 13 or 14.

Optionally, in a case that x<y in the first table, a value of the combinatorial number is 0.

In the implementation, the value of the corresponding combinatorial number C(x,y) may be 0 in a case that x<y.

Therefore, the complexity of calculating the target combinatorial number by the terminal may be reduced.

As an optional implementation, the first condition includes: x/2>=y, and x,y≠0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

The $i^{th}$ element may be the $i^{th}$ element in the sequence selected by the terminal, or the $i^{th}$ element in the antitone sequence, which is specifically dependent on whether the target combinatorial number is the combinatorial number corresponding to the sequence selected by the terminal or the target combinatorial number is obtained based on the combinatorial number corresponding to the antitone sequence. Specifically, $x=N-1-n^{(i)}$, where $n^{(i)}$ is the index of the $i^{th}$ element.

Specifically, in a case that the target combinatorial number is the combinatorial number corresponding to the sequence selected by the terminal, the $i^{th}$ element may be the $i^{th}$ element in the sequence selected by the terminal, and y is equal to L−i. In a case that the target combinatorial number is obtained based on the combinatorial number corresponding to the antitone sequence, the $i^{th}$ element may be the $i^{th}$ element in the antitone sequence, and y is equal to N−L−i.

In the implementation, in a case that x/2>=y and x,y≠0, the target combinatorial number may be calculated by the target calculation mode, so that the complexity of calculating the target combinatorial number by the terminal is reduced.

It is to be noted that in the embodiment of this application, the first condition is not defined, including: x/2>=y, and x,y≠0, for example, in some embodiments, the first condition may be the first condition x/2>=y, but x,y≠0 is not defined.

In the embodiment of this application, under the first condition, the target combinatorial number may be calculated with the first table, the second table or other tables defined by the protocol, which is not limited.

Optionally, the first value and the second value in the target calculation mode are same relative to the combinatorial number of the third value, including: C(x,y)=C(x,x−y);

where the first value is y, the second value is x-y, and the third value is x; and C(x,y) represents the combinatorial number formed by combining x and y, and C(x,x−y) represents a combinatorial number formed by combining x and x−y.

In the implementation, the complexity of calculating the target combinatorial number by the terminal may be reduced in a case that x/2>=y and x,y≠0, and C(x,y)=C(x,x−y).

As an optional implementation, in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

The mode of calculating the target combinatorial number under the first condition or the second condition includes: the target combinatorial number is the combinatorial number corresponding to the antitone sequence, or the combinatorial number obtained from the reference combinatorial number minus the combinatorial number corresponding to the antitone sequence, or the combinatorial number corresponding to the sequence selected by the terminal.

The second condition is a condition which is satisfied by actual values of x and y in calculating C(x,y) in the combinatorial number calculation process, for example, in some embodiments, the second condition includes: x/2<y, or x=y=0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

The values of x and y may refer to corresponding description in the above implementations, which are not described repeatedly herein.

In the optional implementation, the maximum value represented by columns in a second table is smaller than or equal to round down of ½ of the maximum value represented by rows. Therefore, the complexity of calculating the target combinatorial number by the terminal may be reduced, the size of the table is reduced, and the storage space is saved.

For example, the second table may be shown in the table 2 or a table 3:

TABLE 2

| | y | | | | | | |
|---|---|---|---|---|---|---|---|
| x | 1 | 2 | 3 | 4 | 5 | 6 | 7 |
| 0 | 0 | 0 | 0 | 0 | 0 | 0 | 0 |
| 1 | 1 | 0 | 0 | 0 | 0 | 0 | 0 |
| 2 | 2 | 1 | 0 | 0 | 0 | 0 | 0 |
| 3 | 3 | 3 | 1 | 0 | 0 | 0 | 0 |
| 4 | 4 | 6 | 4 | 1 | 0 | 0 | 0 |
| 5 | 5 | 10 | 10 | 5 | 1 | 0 | 0 |
| 6 | 6 | 15 | 20 | 15 | 6 | 1 | 0 |
| 7 | 7 | 21 | 35 | 35 | 21 | 7 | 1 |
| 8 | 8 | 28 | 56 | 70 | 56 | 28 | 8 |
| 9 | 9 | 36 | 84 | 126 | 126 | 84 | 36 |
| 10 | 10 | 45 | 120 | 210 | 252 | 210 | 120 |
| 11 | 11 | 55 | 165 | 330 | 462 | 462 | 330 |
| 12 | 12 | 66 | 220 | 495 | 792 | 924 | 792 |
| 13 | 13 | 78 | 286 | 715 | 1287 | 1716 | 1716 |
| 14 | 14 | 91 | 364 | 1001 | 2002 | 3003 | 3432 |
| 15 | 15 | 105 | 455 | 1365 | 3003 | 5005 | 6435 |

TABLE 3

| | y | | | | | | |
|---|---|---|---|---|---|---|---|
| x | 1 | 2 | 3 | 4 | 5 | 6 | 7 |
| 0 | 0 | 0 | 0 | 0 | 0 | 0 | 0 |
| 1 | 1 | 0 | 0 | 0 | 0 | 0 | 0 |
| 2 | 2 | 1 | 0 | 0 | 0 | 0 | 0 |
| 3 | 3 | — | 1 | 0 | 0 | 0 | 0 |
| 4 | 4 | 6 | — | 1 | 0 | 0 | 0 |
| 5 | 5 | 10 | — | — | 1 | 0 | 0 |
| 6 | 6 | 15 | 20 | — | — | 1 | 0 |
| 7 | 7 | 21 | 35 | — | — | — | 1 |
| 8 | 8 | 28 | 56 | 70 | — | — | — |
| 9 | 9 | 36 | 84 | 126 | — | — | — |
| 10 | 10 | 45 | 120 | 210 | 252 | — | — |
| 11 | 11 | 55 | 165 | 330 | 462 | — | — |
| 12 | 12 | 66 | 220 | 495 | 792 | 924 | — |
| 13 | 13 | 78 | 286 | 715 | 1287 | 1716 | — |

TABLE 3-continued

| | y | | | | | | |
|---|---|---|---|---|---|---|---|
| x | 1 | 2 | 3 | 4 | 5 | 6 | 7 |
| 14 | 14 | 91 | 364 | 1001 | 2002 | 3003 | 3432 |
| 15 | 15 | 105 | 455 | 1365 | 3003 | 5005 | 6435 |

'-' in the table 3 represents that there is no value at the position because the index is not calculated and has been converted to a position with value through C(x,y)=C(x,x−y), so that the complexity of the table is reduced by configuring '-' in the table.

In the table 2 or 3, the candidate values of y are 1-7, and the candidate values of x are 0-15. Thus, in the process of determining the target combinatorial number, by means of the table, the combinatorial number of any combination of the values of y being 1-7 and the values of x being 0-15 may be determined.

It is to be noted that in the embodiment of this application, x and y are not limited to 15 and may be any value. In the embodiment of this application, the tables 1, 2 and 3 are only illustrated with 15.

Optionally, in a case that x<y in the second table, the value of the combinatorial number is 0.

In the implementation, the value of the corresponding combinatorial number C(x,y) may be 0 in a case that x<y. Therefore, the complexity of calculating the target combinatorial number by the terminal may be reduced.

In the embodiment of this application, under the second condition, the target combinatorial number may be calculated with the first table, the second table or other tables defined by the protocol, which is not limited.

As an optional implementation, the step that the terminal determines the target combinatorial number includes:

in a case that the length of the sequence selected by the terminal is greater than the half of the sequence length of the total sequence, the antitone sequence is determined based on the sequence selected by the terminal, and the combinatorial number corresponding to the antitone sequence is generated based on the index and length of the antitone sequence.

The step that the antitone sequence is determined based on the sequence selected by the terminal may be selecting all elements except for the sequence selected by the terminal in the total sequence, so as to obtain the antitone sequence. For example, the sequence length of the total sequence is 8, i.e., the N is equal to 8, and the 8 element indexes are respectively 0,1,2,3,4,5,6,7. When the terminal selects the elements with the indexes of 0, 1, 3, 4, 5, 6, i.e., the L is equal to 6, the antitone sequence is a sequence formed by elements 2, 7.

The step that the combinatorial number corresponding to the antitone sequence is generated based on the index and length of the antitone sequence may be calculating the combinatorial number corresponding to the antitone sequence by the following equation:

$$i_{com} = \begin{cases} \sum_{i=0}^{N-L-1} C\left(N-1-m^{(i)},\ N-L-i\right), & N > L \\ 0, & N = L \end{cases}$$

where $i_{com}$ is the combinatorial number corresponding to the antitone sequence, N is the sequence length of the total sequence, L is the length of the sequence selected by the terminal, i=0, . . . , N−L−1, $m^{(i)}$ is the index of the $i^{th}$ element in the antitone sequence, and in a case that the sequence selected by the terminal is all of the total sequence, N=L, $i_{com}$=0.

In a case that the sequence selected by the terminal is all of the total sequence, N=L. $i_{com}$=0 may be understood that in a case that the sequence selected by the terminal is all of the total sequence, N=L, table look-up is not needed, and $i_{com}$=0 is directly calculated.

The calculation mode may use the first table and the second table provided in the embodiment of this application or the table defined in the protocol, which is not limited.

In addition, in the embodiment of this application, the calculation mode for calculating the combinatorial number corresponding to the antitone sequence is not limited, for example, other modes for calculating the combinatorial number corresponding to a plurality of elements may also be defined by the protocol.

In the implementation, in a case that the length of the sequence selected by the terminal is greater than the half of the length of the total sequence, the antitone sequence of the sequence selected by the terminal is calculated first, i.e., there is no sequence formed by selected element indexes (the sequence may either be orderless or be a sequence from small to large), and then the combinatorial number of the antitone sequence is calculated and used as the finally reported combinatorial number. Upon receiving the combinatorial number, the network side device solves the corresponding element indexes according to a normal algorithm and decides whether negation is needed according to a relationship between the selected quantity and total quantity to finally acquire the sequence selected by the terminal. Therefore, the target combinatorial number is obtained by calculating the combinatorial number corresponding to the antitone sequence, so that the reporting overheads of the terminal are reduced.

In the embodiment of this application, the terminal selects the sequence; and the terminal executes a target operation based on the sequence selected by the terminal, where the target operation includes the following: a target combinatorial number is determined, and the target combinatorial number is reported; in a case that the sequence selected by the terminal is all of a total sequence, the combinatorial number is not reported; where the target combinatorial number has at least one of the following characteristics: the maximum value represented by columns in a first table for calculating the target combinatorial number is greater than ½ of the maximum value represented by rows; in a case that a first condition is satisfied, the target combinatorial number is calculated in a target calculation mode, a first value and a second value in the target calculation mode are same relative to a combinatorial number of a third value, and a sum of the first value and the second value is the third value; in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; in a case that the length of the sequence selected by the terminal is smaller than or equal to the half of the sequence length of the total sequence, the target combinatorial number is a combinatorial number corresponding to the sequence selected by the terminal. In the embodiment of this application, the terminal may be supported to report the combinatorial number corresponding to a longer sequence by means of the first table and the operations corresponding to the first condition. The complexity of the terminal calculating the combinatorial number and the complexity of the network side device restoring the sequence may be reduced by means of the operations corresponding to the antitone sequence. As it can be seen that the combinatorial number reporting performance of the terminal may be improved by the embodiment of this application.

Figures 3, 4:
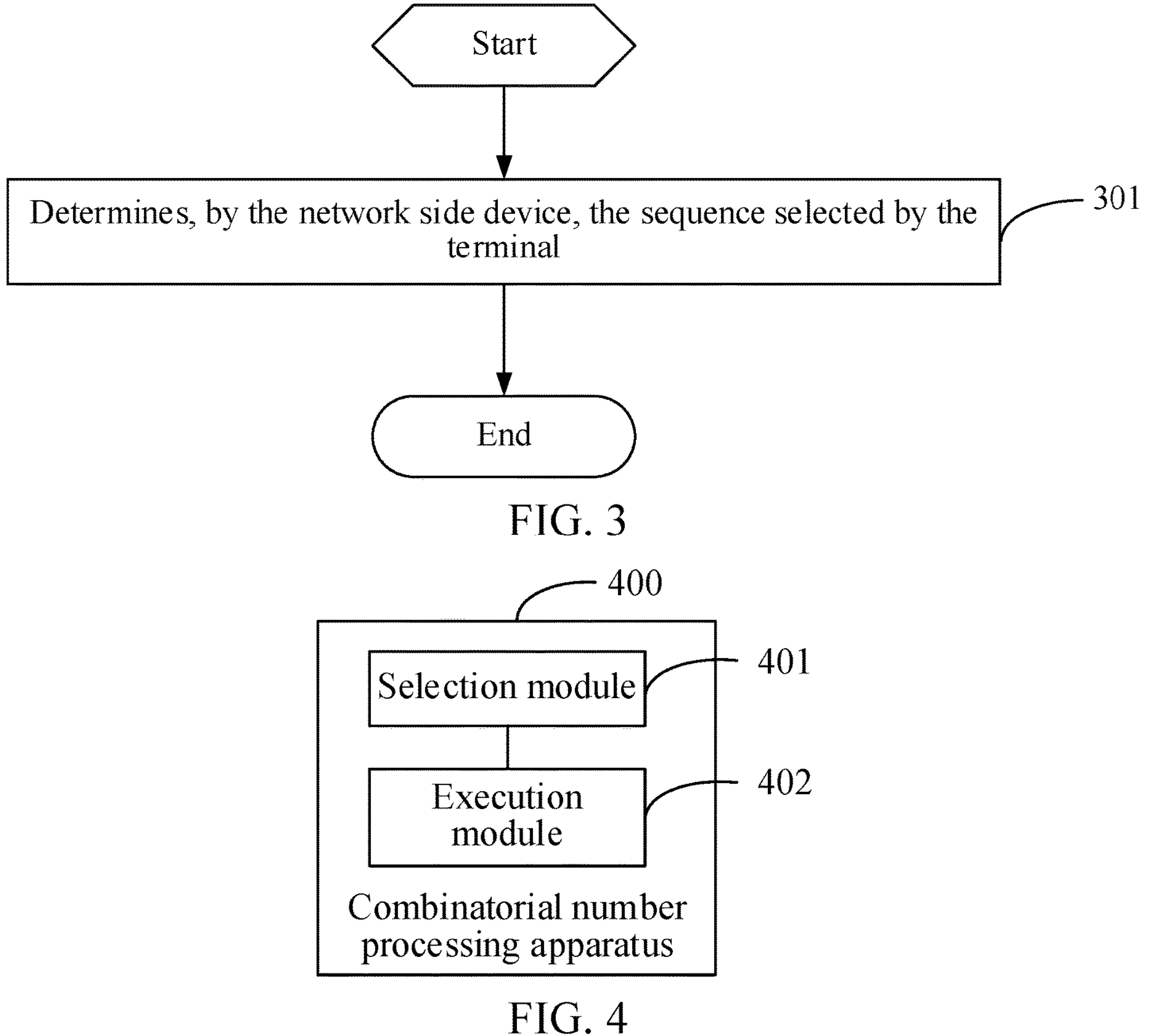
FIG. 3 is a flowchart of a sequence determination method provided by an embodiment of this application.
FIG. 4 is a structure diagram of a combinatorial number processing apparatus provided by an embodiment of this application.

Referring to FIG. 3, FIG. 3 is a flowchart of a sequence determination method provided by an embodiment of this application. As shown in FIG. 3, the method includes the following steps:

S301: a network side device determines a sequence selected by a terminal, where the step of determining the sequence selected by the terminal includes the following:

a target combinatorial number reported by the terminal is received, and the sequence selected by the terminal is determined based on the target combinatorial number; and in a case that the terminal does not report the combinatorial number, it is determined that the sequence selected by the terminal is all of a total sequence;

where the target combinatorial number has at least one of the following characteristics:

the maximum value represented by columns in a first table corresponding to the target combinatorial number is greater than ½ of the maximum value represented by rows;

in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, L is the length of the sequence selected by the terminal, and C(N,L) represents a combinatorial number formed by combining N and L; and in a case that the length of the sequence selected by the terminal is smaller than or equal to the half of the sequence length of the total sequence, the target combinatorial number is a combinatorial number corresponding to the sequence selected by the terminal.

The step that the terminal does not report the combinatorial number may be determined in a manner that the combinatorial number information reported by the terminal is not received on an appointed resource or information in which the terminal indicates no reporting of the combinatorial number, which is not limited.

Optionally, a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and where in a process of determining the target combinatorial number, a value of x is relevant to the sequence length of the total sequence, and a value of y is relevant to the sequence selected by the terminal.

Optionally, in the first table, the maximum candidate value of y is 15, and the maximum candidate value of x is 15.

Optionally, in a case that x<y in the first table, a value of the combinatorial number is 0.

Optionally, the first condition includes: x>=y and x,y≠0;

where x is equal to the sequence length of the total sequence minus an index of the $i^{th}$ element and the minus 1;

y is equal to L–i, i=0, . . . , L–1; or, y is equal to N–L–i, where L is the length of the sequence selected by the terminal, and N is the sequence length of the total sequence, =0, . . . , N–L–1.

Optionally, the first value and the second value in the target calculation mode are same relative to the combinatorial number of the third value, including: C(x,y)=C(x,x–y);

where the first value is y, the second value is x-y, and the third value is x; and C(x,y) represents the combinatorial number formed by combining x and y, and C(x,x–y) represents a combinatorial number formed by combining x and x-y.

Optionally, in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

Optionally, the second condition includes: x/2<y, or x=y=0;

where x is equal to the sequence length of the total sequence minus an index of the $i^{th}$ element and the minus 1;

y is equal to L–i, i=0, . . . , L–1; or, y is equal to N–L–i, where L is the length of the sequence selected by the terminal, and N is the sequence length of the total sequence, =0, . . . , N–L–1.

Optionally, in a case that x<y in the second table, the value of the combinatorial number is 0.

Optionally, the step that the network side device determines the sequence selected by the terminal based on the target combinatorial number includes:

in a case that the length of the sequence selected by the terminal is greater than the half of the sequence length of the total sequence, the antitone sequence corresponding to the target combinatorial number is determined, and the sequence selected by the terminal is determined according to the antitone sequence.

Optionally, the antitone sequence is determined in the following mode:

in the premise of satisfying $i_{com}-s_{i-1}$>=C(x*, N–L–i), the maximum numerical value within a range of {N–L–1–i, N–1–i} is determined as x*, $s_i=s_{i-1}+e_i$, $e_i$=C(x*, N–L–i), where $i_{com}$ is the target combinatorial number, N is the sequence length of the total sequence, and L is the length of the sequence selected by the terminal, i=0, . . . , N–L–1; and the antitone sequence is calculated according to the following equation:

$$m^{(i)} = N - 1 - x^*$$

where $m^{(i)}$ is the index of the $i^{th}$ element in the antitone sequence.

It is to be noted that this embodiment is an implementation of the corresponding network side device in the embodiment shown in FIG. 2. For a specific implementation of this embodiment, refer to related descriptions in the embodiment shown in FIG. 2. To avoid repeated descriptions, details are not described again in this embodiment.

The method provided by the embodiment of this application is illustrated below by means of a plurality of embodiments.

Embodiment 1

The embodiment is mainly illustrated dependent on whether the length of the sequence selected by the terminal is greater than the half of the sequence length of the total sequence:

The terminal determines an alpha value (the value may represent a ratio of a port number in a total port number) and a port number $N_{CSI-RS}$ of the channel state information reference signal (CSI-RS) according to parameters configured at a high level, and calculates K1=$N_{CSI-RS}$*alpha which is the CSI-RS port number needed to be selected. The total number of the corresponding combinatorial number is N=$N_{CSI-RS}$/2. The number of elements needed to be selected is L=K1/2. A dual polarized port selected by the terminal is n=[n(0), n(1) . . . n(L–1)].

In a case that L<=N/2, the terminal performs calculation according to the following equation:

$$i_{com} = \sum_{i=0}^{L-1} C(N - 1 - n^{(i)},\ L - i)$$

In a case that L>N/2, the terminal calculates the antitone sequence of the sequence selected by the terminal first, i.e., the dual polarized port m=[m(0), m(1) . . . m(N–L–1)] not selected, where m and n have no intersection, and a complementary set is a full set, i.e., [0, 1, 2 . . . N–1].

Then the terminal calculates the reported combinatorial number as:

$$i_{com} = \begin{cases} \sum_{i=0}^{N-L-1} C(N - 1 - m^{(i)},\ N - L - i), & N > L \\ 0, & N = L \end{cases}$$

The terminal inputs the combinatorial number in the CSI and feeds it back to the base station; the base station receives the CSI, and solves $i_{com}$. Then, in a case that L<=N/2, the base station directly calculates the element index, specifically as follows:

$$s_{i-1}=0, i=0, \ldots, L-1;$$

In the premise of satisfying $i_{com}-s_{i-1}>=C(x^*, L-i)$, the maximum numerical value determined in a range of {L−1−i, N−1−i} is used as x*(find the largest x* in {L−1−i,N−1−i} such as $i_{com}-s_{i-1}>=C(x^*,L-i)$);

$$e_i=C(x^*,L-i),s_i=s_{i-1}+e_i,n^{(i)}=N-1-x^*;$$

in a case that L>N/2,

S−1=0, $s_{i-1}=0$, i=0, . . . , N−L−1;

in the premise of satisfying $i_{com}-s_{i-1}>=C(x^*, N-L-i)$, the maximum numerical value determined in a range of {N−L−1−i, N−1−i} is used as x* (find the largest x* in {N−L−1−i, N−1−i} such as $i_{com}-s_{i-1}>=C(x^*,N-L-i)$);

$$e_i=C(x^*,L-i),s_i=s_{i-1}+e_i,n^{(1)}=N-1-x^*;$$

the sequence m is obtained, and the sequence is negated, so that the sequence n is the dual polarized port selected by the terminal.

Embodiment 2

In the embodiment, the previous half operation on the terminal side is as same as that in the embodiment I, which is not described repeatedly here.

In a case that L>N/2, the reported combinatorial number is $C(N,L)-1-i_{com}$.

Upon acquiring the reported combinatorial number according to the content fed back by the CSI, the network side device directly solves n according to the solution: L<=N/2 in the embodiment 1.

In the embodiment of this application, in the combinatorial number calculation process, in a case that the length of the sequence selected is greater than the half of the length of the total sequence, the antitone sequence of the sequence selected is calculated, so that the overheads are reduced. The combinatorial number of the antitone sequence is reported or the combinatorial number of a normal sequence obtained from a total probable value minus the combinatorial number of the antitone sequence is reported, so that the complexity of calculation by the terminal is reduced, and the complexity of calculation by the network side device is reduced.

Referring to FIG. 4, FIG. 4 is a structure diagram of a combinatorial number processing apparatus provided by an embodiment of this application. As shown in FIG. 4, a combinatorial number processing apparatus includes:

a selection module 401, configured to select a sequence;

an execution module 402, configured to execute, by the terminal, a target operation based on the sequence selected by the terminal, where the target operation includes the following:

a target combinatorial number is determined, and the target combinatorial number is reported;

in a case that the sequence selected by the terminal is all of a total sequence, the combinatorial number is not reported;

where the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

Optionally, a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and where in a process of determining the target combinatorial number, a value of x is relevant to the sequence length of the total sequence, and a value of y is relevant to the sequence selected by the terminal.

Optionally, in the first table, the maximum candidate value of y is 15, and the maximum candidate value of x is 15.

Optionally, in a case that x<y in the first table, a value of the combinatorial number is 0.

Optionally, the first condition includes: x/2>=y, and x,y=0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, the first value and the second value in the target calculation mode are same relative to the combinatorial number of the third value, including: C(x,y)=C(x,x−y);

where the first value is y, the second value is x-y, and the third value is x; and C(x,y) represents the combinatorial number formed by combining x and y, and C(x,x−y) represents a combinatorial number formed by combining x and x-y.

Optionally, in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

Optionally, the second condition includes: $x/2<y$, or $x=y=0$;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, in a case that x<y in the second table, the value of the combinatorial number is 0.

Optionally, the step that the target combinatorial number is determined includes:

in a case that the length of the sequence selected by the terminal is greater than the half of the sequence length of the total sequence, the antitone sequence is determined based on the sequence selected by the terminal, and the combinatorial number corresponding to the antitone sequence is generated based on the index and length of the antitone sequence.

Optionally, the combinatorial number corresponding to the antitone sequence includes:

$$i_{com} = \begin{cases} \sum_{i=0}^{N-L-1} C\left(N-1-m^{(i)},\ N-L-i\right), & N > L \\ 0, & N = L \end{cases}$$

where $i_{com}$ is the combinatorial number corresponding to the antitone sequence, N is the sequence length of the total sequence, L is the length of the sequence selected by the terminal, i=0, . . . , N−L−1, $m^{(i)}$ is the index of the $i^{th}$ element in the antitone sequence, and in a case that the sequence selected by the terminal is all of the total sequence, N=L, $i_{com}=0$.

The combinatorial number processing apparatus in the embodiment of this application may be an apparatus or an electronic device with an operating system, or may be a component, an integrated chip or a chip in the terminal. The apparatus or the electronic device may be a mobile terminal or may be a non-mobile terminal. Exemplarily, the mobile terminal may include, but may not be limited to, the type of the terminal 11 listed above. The non-mobile terminal may be a server, a network attached storage (NAS), a personal computer (PC), a television (TV), a teller machine, a self-service machine, or the like, and the type is not specifically defined in this embodiment of this application.

The combinatorial number processing apparatus provided by the embodiment of this application can implement various processes implemented by the method embodiment in FIG. 2. To avoid repetition, details are not described herein again.

Figures 5, 6:
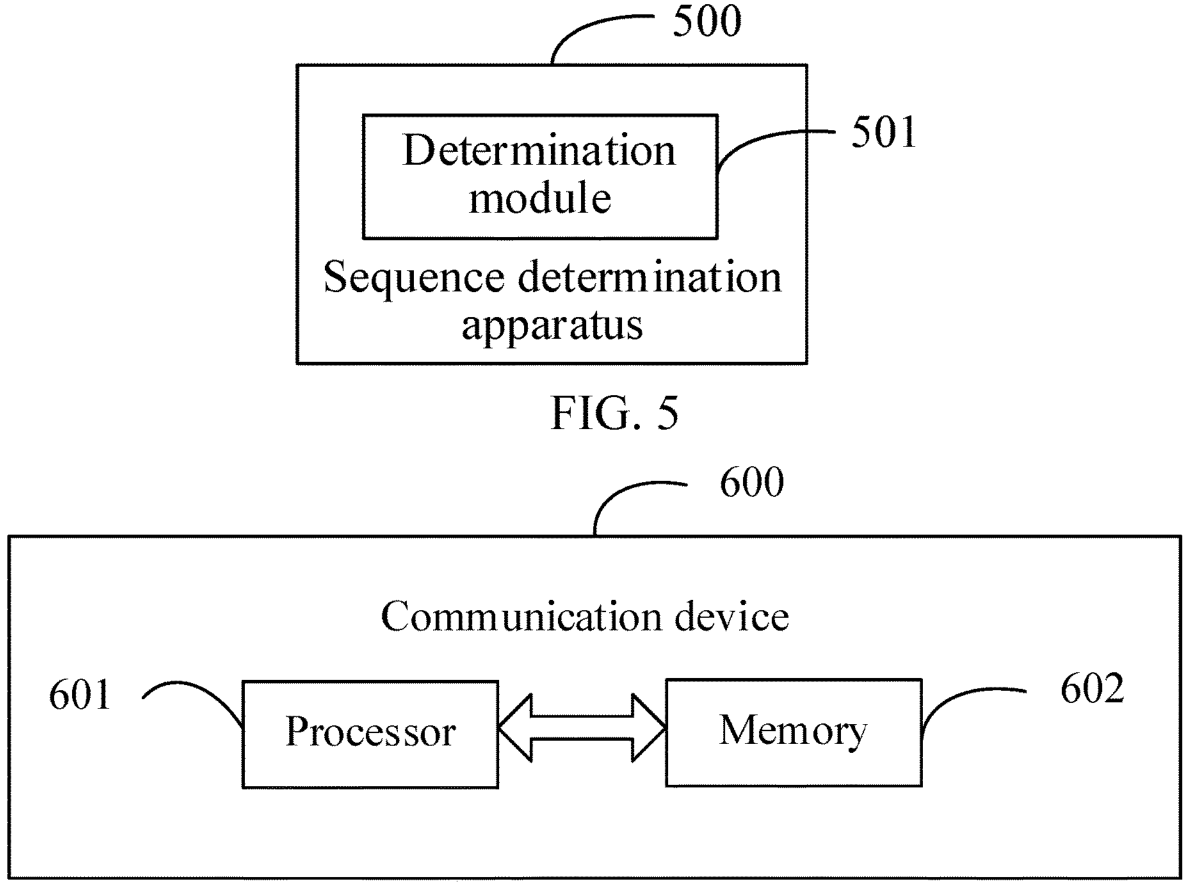
FIG. 5 is a structure diagram of a sequence determination apparatus provided by an embodiment of this application.
FIG. 6 is a structure diagram of a communication device provided by an embodiment of this application.

Referring to FIG. 5, FIG. 5 is a structure diagram of a sequence determination apparatus provided by an embodiment of this application. As shown in FIG. 5, the sequence determination apparatus includes:

a determination module 501, configured to determine, by a network side device, a sequence selected by a terminal, where the step of determining the sequence selected by the terminal includes the following:

a target combinatorial number reported by the terminal is received, and the sequence selected by the terminal is determined based on the target combinatorial number; and in a case that the terminal does not report the combinatorial number, it is determined that the sequence selected by the terminal is all of a total sequence;

where the target combinatorial number has at least one of the following characteristics:

the maximum value represented by columns in a first table corresponding to the target combinatorial number is greater than ½ of the maximum value represented by rows;

in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

Optionally, a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and where in a process of determining the target combinatorial number, a value of x is relevant to the sequence length of the total sequence, and a value of y is relevant to the sequence selected by the terminal.

Optionally, in the first table, the maximum candidate value of y is 15, and the maximum candidate value of x is 15.

Optionally, in a case that x<y in the first table, a value of the combinatorial number is 0.

Optionally, the first condition includes: $x>=y$ and $x,y\neq 0$;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, the first value and the second value in the target calculation mode are same relative to the combinatorial number of the third value, including: C(x,y)=C(x,x−y);

where the first value is y, the second value is x-y, and the third value is x; and $C(x,y)$ represents the combinatorial number formed by combining x and y, and $C(x,x-y)$ represents a combinatorial number formed by combining x and x-y.

Optionally, in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

Optionally, the second condition includes: $x/2<y$, or $x=y=0$;

where x is equal to the sequence length of the total sequence minus an index of the $i^{th}$ element and the minus 1;

y is equal to $L-i$, $i=0, \ldots, L-1$; or, y is equal to $N-L-i$, where L is the length of the sequence selected by the terminal, and N is the sequence length of the total sequence, $=0, \ldots, N-L-1$.

Optionally, in a case that $x<y$ in the second table, the value of the combinatorial number is 0.

Optionally, the step that the sequence selected by the terminal is determined based on the target combinatorial number includes:

in a case that the length of the sequence selected by the terminal is greater than the half of the sequence length of the total sequence, the antitone sequence corresponding to the target combinatorial number is determined, and the sequence selected by the terminal is determined according to the antitone sequence.

Optionally, the antitone sequence is determined in the following mode:

in the premise of satisfying $i_{com}-s_{i-1}>=C(x^*, N-L-i)$, the maximum numerical value within a range of $\{N-L-1-i, N-1-i\}$ is determined as $x^*$, $s_i=s_{i-1}+e_i$, $e_i=C(x^*, N-L-i)$, where $i_{com}$ is the target combinatorial number, N is the sequence length of the total sequence, and L is the length of the sequence selected by the terminal, $i=0, \ldots, N-L-1$; and the antitone sequence is calculated according to the following equation:

$$m^{(i)}=N-1-x^*$$

where $m^{(i)}$ is the index of the $i^{th}$ element in the antitone sequence.

The sequence determination apparatus in the embodiment of this application may be an apparatus or an electronic device with an operating system, or may be a component, an integrated chip or a chip in the network side device. The apparatus or the network side device may be base station.

The sequence determination apparatus provided by the embodiment of this application can implement various processes implemented by the method embodiment in FIG. 6 and achieve the same technical solution. To avoid repetition, details are not described herein again.

Optionally, as shown in FIG. 6, the embodiment of this application further provides a communication device 600, including a processor 601, a memory 602, and a program or an instruction stored in the memory 602 and executable in the processor 601. For example, in a case that the communication device 600 is the terminal, the program or instruction, when executed by the processor 601, achieves various processes of the combinatorial number processing method embodiment on the network device side and can achieve the same technical effect. In a case that the communication device 600 is the network side device, the program or instruction, when executed by the processor 601, achieves various processes of the sequence determination method embodiment on the terminal side and can achieve the same technical effect. To avoid repetition, details are not described herein again. The communication device is the terminal or the network side device.

An embodiment of this application further provides a communication device, including: a processor and a communication interface, where the processor or the communication interface is configured to: select a sequence; and the terminal executes a target operation based on the sequence selected by the terminal, where the target operation includes the following: determine a target combinatorial number, and report the target combinatorial number; in a case that the sequence selected by the terminal is all of a total sequence, not report the combinatorial number; where the target combinatorial number has at least one of the following characteristics: the maximum value represented by columns in a first table for calculating the target combinatorial number is greater than ½ of the maximum value represented by rows; in a case that a first condition is satisfied, the target combinatorial number is calculated in a target calculation mode, a first value and a second value in the target calculation mode are same relative to a combinatorial number of a third value, and a sum of the first value and the second value is the third value; in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is $C(N,L)-1$, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

Or, the communication interface is configured to: the communication interface or the processor is configured to: determine a sequence selected by a terminal, where the step of determining the sequence selected by the terminal includes the following: a target combinatorial number reported by the terminal is received, and the sequence selected by the terminal is determined based on the target combinatorial number; and in a case that the terminal does not report the combinatorial number, it is determined that the sequence selected by the terminal is all of a total sequence; where the target combinatorial number has at least one of the following characteristics: the maximum value represented by columns in a first table corresponding to the target combinatorial number is greater than ½ of the maximum value represented by rows; in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value; in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

The communication device embodiment corresponds to the method embodiment shown in FIG. 2 and FIG. 3, and various implementation processes and implementations of the above method embodiment are applicable to the communication device embodiment and can achieve the same technical effect.

Figure 7:
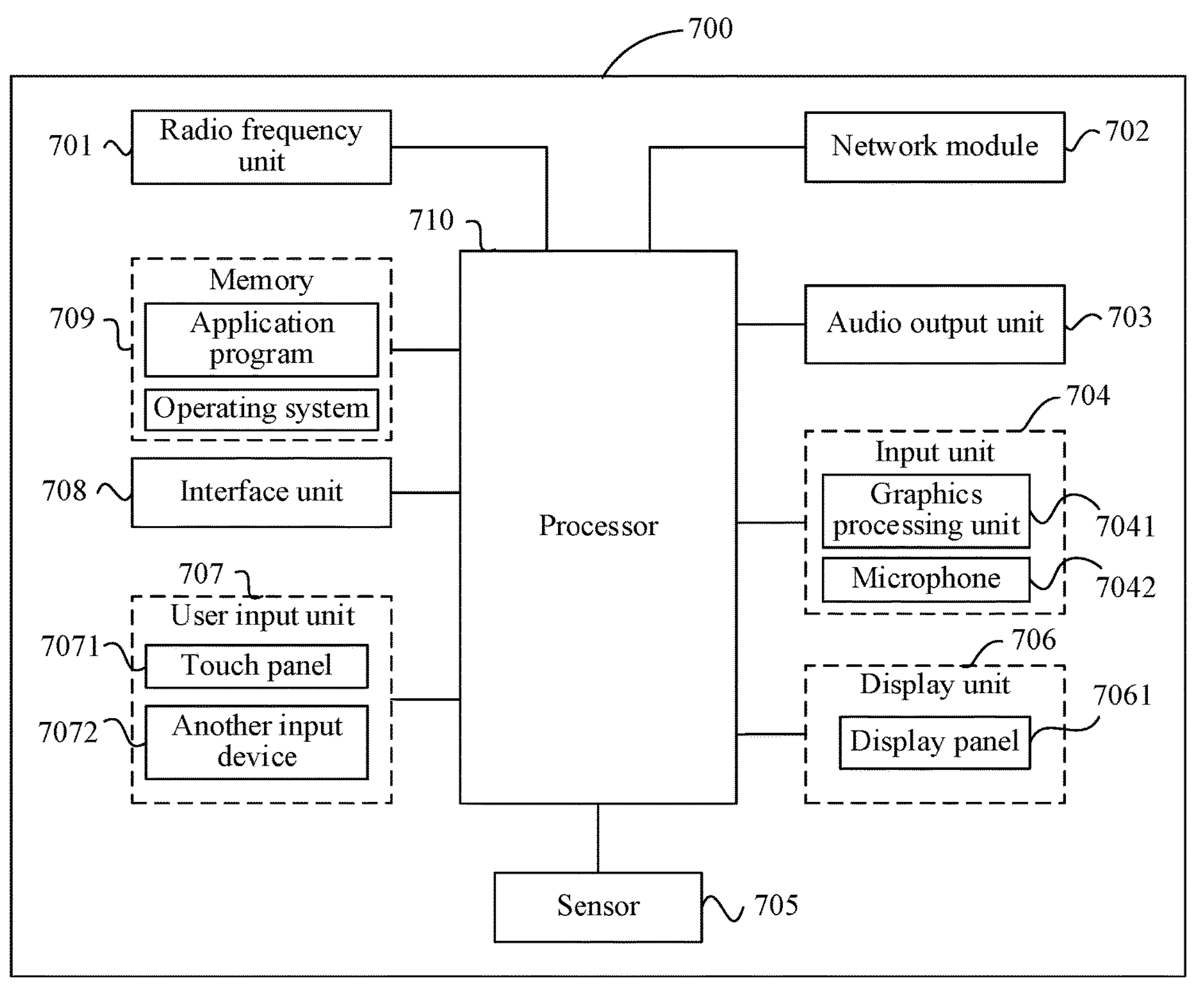
FIG. 7 is a structure diagram of a terminal provided by an embodiment of this application.

Specifically, FIG. 7 is a schematic diagram of a hardware structure of a terminal according to the embodiment of this application.

The terminal 700 includes, but not limited to: at least a part of a radio frequency unit 701, a network module 702, an audio output unit 703, an input unit 704, a sensor 705, a display unit 706, a user input unit 707, an interface unit 708, a memory 709 and a processor 710.

Those in the skill may understand that the terminal 700 may further include a power supply (such as a battery) for supplying power to the components. The power supply may be logically connected to the processor 710 by a power management system, thereby implementing functions such as charging, discharging, and power consumption management by using the power management system. The structure of the terminal shown in FIG. 2 does not constitute a limitation on the communication device, and the terminal may include more or fewer components than shown, or combine some components, or have different component arrangements, which are not described herein in detail.

It is to be understood that in the embodiment of this application, the input unit 704 may include a graphics processing unit (GPU) 7041 and a microphone 7042. The graphics processing unit 7041 performs processing on image data of a static picture or a video that is obtained by an image acquisition device (for example, a camera) in a video acquisition mode or an image acquisition mode. The display unit 706 may include a display panel 7061. The display panel 7061 may be configured in the form of a liquid crystal display (LCD) and an organic light-emitting diode (OLED). The user input unit 707 includes a touch panel 7071 and another input device 7072. The touch panel 7071 is also known as a touch screen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick, which are not described herein in detail.

In the embodiment of this application, after the radio frequency unit 701 receives the downlink data from the network side device, the downlink data is sent to the processor 710 for processing; In addition, the uplink data is sent to the network side device. Generally, the radio frequency unit 701 includes, but is not limited to, an antenna, at least one amplifier, a transceiver, a coupler, a low noise amplifier, a duplexer, and the like.

The memory 709 may be configured to store a software program or instruction and various data. The memory 709 may mainly include a storage program or an instruction area and a data storage area. The program storage area may store an operating system, an application program or instruction required by at least one function (for example, a sound playback function and an image display function), and the like. In addition, the memory 709 may include a high speed random access memory and may further include a non-volatile memory. The non-volatile memory may be a read-only memory (ROM), a programmable ROM (PROM), an erasable programmable read-only memory (EPROM), an electrically EPROM (EEPROM), or a flash memory. For example, at least one magnetic disk storage device, a flash memory or another volatile solid-state storage device.

The processor 710 may include one or more processing units. Optionally, the processor 710 may integrate an application processor and a modem processor. The application processor mainly processes an operating system, a user interface, an application program, an instruction and the like. The modem processor mainly processes wireless communication, such as baseband processor. It may be understood that, the modem processor may alternatively not be integrated in the processor 710.

The radio frequency unit 701 or the processor 710 is further configured to:

select a sequence; and execute a target operation based on the sequence selected by the terminal, where the target operation includes the following:

determine a target combinatorial number, and report the target combinatorial number;

in a case that the sequence selected by the terminal is all of a total sequence, not report the combinatorial number;

where the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

Optionally, a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and where in a process of determining the target combinatorial number, a value of x is relevant to the sequence length of the total sequence, and a value of y is relevant to the sequence selected by the terminal.

Optionally, in the first table, the maximum candidate value of y is 15, and the maximum candidate value of x is 15.

Optionally, in a case that x<y in the first table, a value of the combinatorial number is 0.

Optionally, the first condition includes: x/2>=y, and x,y≠0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, the first value and the second value in the target calculation mode are same relative to the combinatorial number of the third value, including: C(x,y)=C(x,x−y);

where the first value is y, the second value is x-y, and the third value is x; and C(x,y) represents the combinatorial number formed by combining x and y, and C(x,x−y) represents a combinatorial number formed by combining x and x-y.

Optionally, in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

Optionally, the second condition includes: x/2<y, or x=y=0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, in a case that x<y in the second table, the value of the combinatorial number is 0.

Optionally, the step that the target combinatorial number is determined includes:

in a case that the length of the sequence selected by the terminal is greater than the half of the sequence length of the total sequence, the antitone sequence is determined based on the sequence selected by the terminal, and the combinatorial number corresponding to the antitone sequence is generated based on the index and length of the antitone sequence.

Optionally, the combinatorial number corresponding to the antitone sequence includes:

$$i_{com} = \begin{cases} \sum_{i=0}^{N-L-1} C\left(N-1-m^{(i)},\ N-L-i\right), & N > L \\ 0, & N = L \end{cases}$$

where $i_{com}$ is the combinatorial number corresponding to the antitone sequence, N is the sequence length of the total sequence, L is the length of the sequence selected by the terminal, i=0, . . . , N−L−1, $m^{(i)}$ is the index of the $i^{th}$ element in the antitone sequence, and in a case that the sequence selected by the terminal is all of the total sequence, N=L, $i_{com}$=0.

Specifically, the terminal in the embodiment of this application further includes: an instruction or a program stored in a memory 709 and runnable in a processor 710, where the processor 710 calls the instruction or program in the memory 709 to execute the method executed by the modules in FIG. 4, and achieves the same technical effect. To avoid repetition, details are not described herein again.

Figure 8:
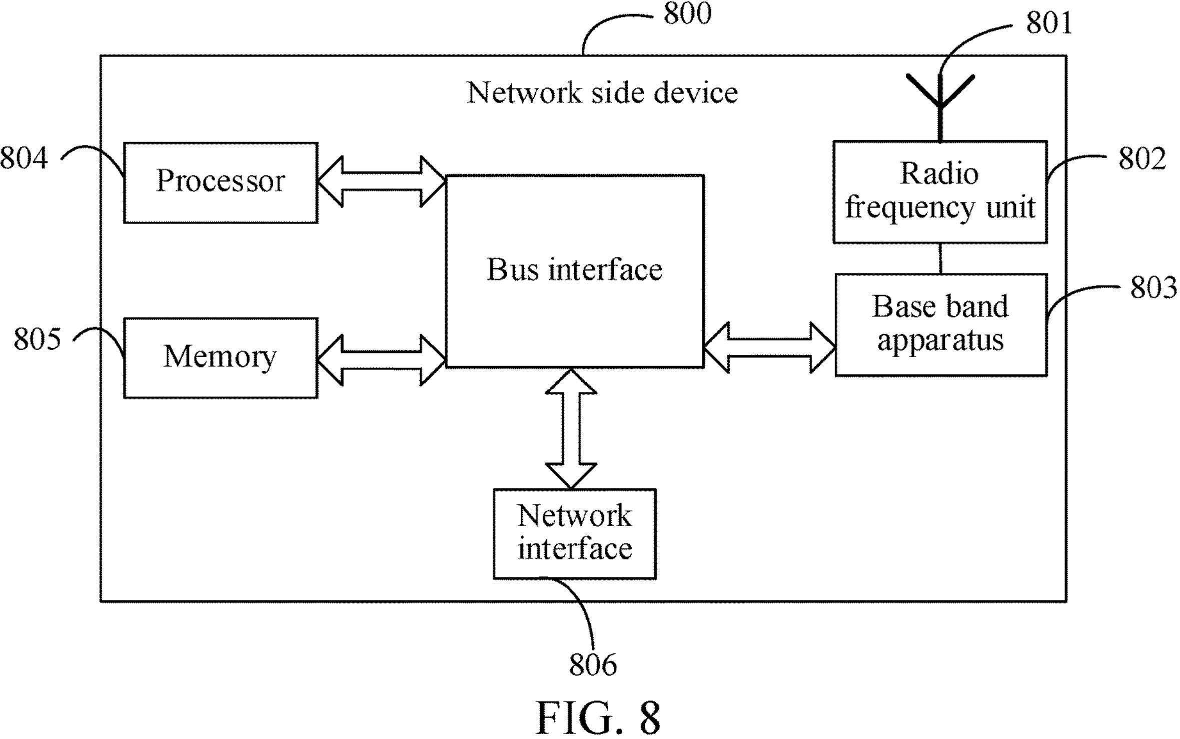
FIG. 8 is a structure diagram of a network side device provided by an embodiment of this application.

Specifically, the embodiment of this application provides a network side device. As shown in FIG. 8, the network side device 800 includes: an antenna 801, a radio frequency apparatus 802 and a base band apparatus 803. The antenna 801 is connected to the radio frequency apparatus 802. In an uplink direction, the radio frequency apparatus 802 receives information through the antenna 801 and transmits the received information to the base band apparatus 803 for processing. In a downlink direction, the base band apparatus 803 processes information to be transmitted and transmits the information to the radio frequency apparatus 802. The received information processed by the radio frequency apparatus 802 is transmitted through the antenna 801.

The frequency band processing apparatus may be located in the base band apparatus 803. The method executed by the network side device in the above embodiments may be implemented in the base band apparatus 803. The base band apparatus 803 includes the processor 804 and the memory 805.

The base band apparatus 803 may, for example, include at least one base band board. A plurality of chips are arranged on the base band board. As shown in FIG. 8, one of the chips is, for example, the processor 804 connected to the memory 805 to call the program in the memory 805, so as to execute the network side device operation shown in the above method embodiment.

The base band apparatus 803 may further include a network interface 806, configured to interact with the radio frequency apparatus 802 in information. The interface is, for example, a common public ratio interface (CPRI).

A radio frequency apparatus 802 or a processor 804 is configured to determine a sequence selected by a terminal, where the step of determining the sequence selected by the terminal includes the following:

a target combinatorial number reported by the terminal is received, and the sequence selected by the terminal is determined based on the target combinatorial number; and in a case that the terminal does not report the combinatorial number, it is determined that the sequence selected by the terminal is all of a total sequence;

where the target combinatorial number has at least one of the following characteristics:

the maximum value represented by columns in a first table corresponding to the target combinatorial number is greater than ½ of the maximum value represented by rows;

in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; where the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, where N is the sequence length of the total sequence, and L is the length of the sequence selected by the terminal; and in a case that the length of the sequence selected by the terminal is smaller than or equal to the half of the sequence length of the total sequence, the target combinatorial number is a combinatorial number corresponding to the sequence selected by the terminal.

Optionally, a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and where in a process of determining the target combinatorial number, a value of x is relevant to the sequence length of the total sequence, and a value of y is relevant to the sequence selected by the terminal.

Optionally, in the first table, the maximum candidate value of y is 15, and the maximum candidate value of x is 15.

Optionally, in a case that x<y in the first table, a value of the combinatorial number is 0.

Optionally, the first condition includes: x>=y and x,y/0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, the first value and the second value in the target calculation mode are same relative to the combinatorial number of the third value, including: C(x,y)=C(x,x−y);

where the first value is y, the second value is x-y, and the third value is x; and C(x,y) represents the combinatorial number formed by combining x and y, and C(x,x−y) represents a combinatorial number formed by combining x and x-y.

Optionally, in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

Optionally, the second condition includes: x/2<y, or x=y=0;

where x is equal to the sequence length of the total sequence minus an index of the $i^{th}$ element and the minus 1;

y is equal to L−i, i=0, . . . , L−1; or, y is equal to N−L−i, where L is the length of the sequence selected by the terminal, and N is the sequence length of the total sequence, =0, . . . , N−L−1.

Optionally, in a case that x<y in the second table, the value of the combinatorial number is 0.

Optionally, the step that the sequence selected by the terminal is determined based on the target combinatorial number includes:

in a case that the length of the sequence selected by the terminal is greater than the half of the sequence length of the total sequence, the antitone sequence corresponding to the target combinatorial number is determined, and the sequence selected by the terminal is determined according to the antitone sequence.

Optionally, the antitone sequence is determined in the following mode:

in the premise of satisfying $i_{com}-s_{i-1}>=C(x^*, N-L-i)$, the maximum numerical value within a range of {N−L−1−i, N−1−i} is determined as x*, $s_i=s_{i-1}+e_i$, $e_i=C(x^*, N-L-i)$, where $i_{com}$ is the target combinatorial number, N is the sequence length of the total sequence, and L is the length of the sequence selected by the terminal, i=0, . . . , N−L−1; and the antitone sequence is calculated according to the following equation:

$$m^{(i)} = N - 1 - x^*$$

where $m^{(i)}$ is the index of the $i^{th}$ element in the antitone sequence.

Specifically, the network side device in the embodiment of this application further includes: an instruction or a program stored in a memory 805 and runnable in a processor 804, where the processor 804 calls the instruction or program in the memory 805 to execute the method executed by the modules in FIG. 5, and achieves the same technical effect. To avoid repetition, details are not described herein again.

An embodiment of this application provides a readable storage medium, having a program or instruction stored in the readable storage medium, where the program or instruction, when executed by the processor, implements the steps of the combinatorial number processing method provided by the embodiment of this application or the program or instruction, when executed by the processor, implements the steps of the sequence determination method provided by the embodiment of this application.

The processor is a processor in the terminal in the above embodiments. The readable storage medium includes a computer readable storage medium such as a Read-Only Memory (ROM), a Random Access Memory (RAM), a magnetic disk, or an optical disc.

The embodiment of this application further provides a chip. The chip includes a processor and a communication interface, where the communication interface is coupled to the processor, and the processor is configured to run a program or an instruction to implement various processes of the embodiments of the combinatorial number processing method or the sequence determination method and can achieve the same technical effect. To avoid repetition, details are not described herein again.

It is to be understood that the chip mentioned in this embodiment of this application may also be called a system-level chip, a system chip, a chip system or a system on chip, etc.

An embodiment of this application further provides a computer program product, stored in a non-volatile storage medium. The computer program product is executed by at least one processor to implement various processes of the above method embodiment and can achieve the same technical effect. To avoid repetition, details are not repeated herein.

It is to be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it is to be pointed out that the scopes of the method and apparatus in the implementations of this application are not limited and functions are executed according to the illustrated or discussed sequence. The functions may also be executed in a basically simultaneous way or in a reverse sequence based on the functions involved. For example, the described method may be executed according to a sequence different from the described sequence, and various steps may further be added, omitted or combined. In addition, features described with reference to some examples may also be combined in other examples.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal device (which may be a mobile phone, a computer, a server, a network device, or the like) to perform the methods described in the embodiments of this application.

The embodiments of this application have been described above with reference to the drawings. This application is not limited to the specific embodiments described above, and the specific embodiments described above are merely exemplary rather than limitative. Those of ordinary skill in the art may make various variations under the teaching of this application without departing from the spirit of this application and the protection scope of the claims, and such variations shall all fall within the protection scope of this application.

What is claimed is:

1. A combinatorial number processing method, comprising:

selecting, by a terminal, a sequence; and executing, by the terminal, a target operation based on the sequence selected by the terminal, wherein the target operation comprises the following:

determining a target combinatorial number in a Channel State Information (CSI) report, and reporting the CSI report with the target combinatorial number; and in a case that the sequence selected by the terminal is all of a total sequence, not reporting the combinatorial number;

wherein the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; wherein the antitone sequence is a sequence formed by all elements of the total sequence except for the sequence selected by the terminal or the antitone sequence is null in a case that the sequence selected by the terminal is all of the total sequence, and the reference combinatorial number is $C(N,L)-1$, wherein N is the sequence length of the total sequence, L is the length of the sequence selected by the terminal, and $C(N,L)$ represents a combinatorial number formed by combining N and L; or in a case that the length of the sequence selected by the terminal is smaller than or equal to the half of the sequence length of the total sequence, the target combinatorial number is a combinatorial number corresponding to the sequence selected by the terminal.

2. The method according to claim 1, wherein a column in the first table is used to represent candidate values of y in $C(x,y)$, a row in the first table is used to represent candidate values of x in $C(x,y)$, the maximum candidate value of y in the first table is equal to the maximum candidate value of x, and C(x,y) represents a combinatorial number formed by combining x and y; and wherein in a process of determining the target combinatorial number, a value of x is relevant to the sequence length of the total sequence, and a value of y is relevant to the sequence selected by the terminal.

3. The method according to claim 2, wherein in the first table, the maximum candidate value of y is 15, and the maximum candidate value of x is 15.

4. The method according to claim 2, wherein in a case that x<y in the first table, a value of the combinatorial number is 0.

5. The method according to claim 1, wherein the first condition comprises: x/2>=y, and x,y≠0;

wherein x is equal to the sequence length of the total sequence minus an index of the $i^{th}$ element and the minus 1;

y is equal to L−i, i=0, . . . , L−1; or, y is equal to N−L−i, wherein L is the length of the sequence selected by the terminal, and N is the sequence length of the total sequence, −0, . . . , N−L−1.

6. The method according to claim 5, wherein the first value and the second value in the target calculation mode are same relative to the combinatorial number of the third value, comprising: C(x,y)=C(x,x−y);

wherein the first value is y, the second value is x-y, and the third value is x; and C(x,y) represents the combinatorial number formed by combining x and y, and C(x,x−y) represents a combinatorial number formed by combining x and x-y.

7. The method according to claim 1, wherein in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

8. The method according to claim 7, wherein the second condition comprises: x/2<y, or x=y=0;

wherein x is equal to the sequence length of the total sequence minus an index of the $i^{th}$ element and the minus 1;

y is equal to L−i, i=0, . . . , L−1; or, y is equal to N−L−i, wherein L is the length of the sequence selected by the terminal, and N is the sequence length of the total sequence, =0, . . . , N−L−1.

9. A sequence determination method, comprising:

determining, by a network side device, a sequence selected by a terminal, wherein the step of determining the sequence selected by the terminal comprises the following:

receiving a Channel State Information (CSI) report with a target combinatorial number determined by the terminal, and determining the sequence selected by the terminal based on the target combinatorial number; and in a case that the terminal does not report the combinatorial number, determining that the sequence selected by the terminal is all of a total sequence;

wherein the target combinatorial number has at least one of the following characteristics:

the maximum value represented by columns in a first table corresponding to the target combinatorial number is greater than ½ of the maximum value represented by rows;

in a case that a first condition is satisfied, a sequence corresponding to the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; wherein the antitone sequence is a sequence formed by all elements of the total sequence except for the sequence selected by the terminal or the antitone sequence is null in a case that the sequence selected by the terminal is all of the total sequence, and the reference combinatorial number is C(N,L)−1, wherein N is the sequence length of the total sequence, L is the length of the sequence selected by the terminal, and C(N,L) represents a combinatorial number formed by combining N and L; or in a case that the length of the sequence selected by the terminal is smaller than or equal to the half of the sequence length of the total sequence, the target combinatorial number is a combinatorial number corresponding to the sequence selected by the terminal.

10. The method according to claim 9, wherein a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and wherein in a process of determining the target combinatorial number, a value of x is relevant to the sequence length of the total sequence, and a value of y is relevant to the sequence selected by the terminal.

11. The method according to claim 10, wherein in the first table, the maximum candidate value of y is 15, and the maximum candidate value of x is 15.

12. The method according to claim 10, wherein in a case that x<y in the first table, a value of the combinatorial number is 0.

13. The method according to claim 9, wherein the first condition comprises: x>=y and x,y≠0;

wherein x is equal to the sequence length of the total sequence minus an index of the $i^{th}$ element and the minus 1;

y is equal to L−i, i=0, . . . , L−1; or, y is equal to N−L−i, wherein L is the length of the sequence selected by the terminal, and N is the sequence length of the total sequence, =0, . . . , N−L−1.

14. The method according to claim 13, wherein the first value and the second value in the target calculation mode are same relative to the combinatorial number of the third value, comprising: C(x,y)=C(x,x−y);

wherein the first value is y, the second value is x-y, and the third value is x; and C(x,y) represents the combinatorial number formed by combining x and y, and C(x,x−y) represents a combinatorial number formed by combining x and x-y.

15. The method according to claim 9, wherein in a case that a second condition is satisfied, the maximum value represented by columns in a second table for calculating the target combinatorial number is smaller than or equal to round down of ½ of the maximum value represented by rows; or, in a case that the first condition is satisfied, the maximum value represented by the columns in the second table for calculating the target combinatorial number is smaller than ½ of the maximum value represented by the rows.

16. The method according to claim 15, wherein the second condition comprises: $x/2<y$, or $x=y=0$;

wherein x is equal to the sequence length of the total sequence minus an index of the $i^{th}$ element and the minus 1;

y is equal to $L-i$, $i=0, \ldots, L-1$; or, y is equal to $N-L-i$, wherein L is the length of the sequence selected by the terminal, and N is the sequence length of the total sequence, $=0, \ldots, N-L-1$.

17. A network side device, comprising: a memory, a processor, and a program or instruction stored on the memory and executable on the processor, wherein the program or instruction, when executed by the processor, implements the steps of the sequence determination method according to claim 9.

18. A terminal, comprising: a memory, a processor, and a program or instruction stored on the memory and executable on the processor, wherein the program or instruction, when executed by the processor, causes the terminal to perform:

selecting a sequence; and executing a target operation based on the sequence, wherein when executing the target operation, the program or instruction, when executed by the processor, causes the terminal to perform:

determining a target combinatorial number in a Channel State Information (CSI) report, and reporting the CSI report with the target combinatorial number; and in a case that the sequence is all of a total sequence, not reporting the combinatorial number;

wherein the target combinatorial number has at least one of the following characteristics:

the maximum value represented by columns in a first table for calculating the target combinatorial number is greater than ½ of the maximum value represented by rows;

in a case that a first condition is satisfied, the target combinatorial number is calculated in a target calculation mode, a first value and a second value in the target calculation mode are same relative to a combinatorial number of a third value, and a sum of the first value and the second value is the third value;

in a case that a length of the sequence selected by the terminal is greater than a half of a sequence length of the total sequence, the target combinatorial number is a combinatorial number corresponding to an antitone sequence; or, in a case that the length of the sequence selected by the terminal is greater than the half of the sequence length of the total sequence, the target combinatorial number is a combinatorial number obtained by a reference combinatorial number minus the combinatorial number corresponding to the antitone sequence; wherein the antitone sequence is a sequence formed by all elements of the total sequence except for the sequence selected by the terminal or the antitone sequence is null in a case that the sequence selected by the terminal is all of the total sequence, and the reference combinatorial number is $C(N,L)-1$, wherein N is the sequence length of the total sequence, L is the length of the sequence selected by the terminal, and C(N,L) represents a combinatorial number formed by combining N and L; or in a case that the length of the sequence selected by the terminal is smaller than or equal to the half of the sequence length of the total sequence, the target combinatorial number is a combinatorial number corresponding to the sequence selected by the terminal.

19. The terminal according to claim 18, wherein a column in the first table is used to represent candidate values of y in C(x,y), a row in the first table is used to represent candidate values of x in C(x,y), the maximum candidate value of y in the first table is equal to the maximum candidate value of x, and C(x,y) represents a combinatorial number formed by combining x and y; and wherein in a process of determining the target combinatorial number, a value of x is relevant to the sequence length of the total sequence, and a value of y is relevant to the sequence selected by the terminal.

20. The terminal according to claim 19, wherein in the first table, the maximum candidate value of y is 15, and the maximum candidate value of x is 15.

* * * * *